US006188715B1

(12) United States Patent
Partyka (10) Patent No.: US 6,188,715 B1
(45) Date of Patent: Feb. 13, 2001

(54) FREQUENCY HOPPING SYSTEM FOR INTERMITTENT TRANSMISSION WITH RECEIVER USING INDIVIDUAL TRACKING, FFT, AND AUTHENTICATION

(76) Inventor: Andrzej Partyka, 370 Finch La., Bedminster, NJ (US) 07921

( * ) Notice: Under 35 U.S.C. 154(b), the term of this patent shall be extended for 0 days.

(21) Appl. No.: 09/057,859

(22) Filed: Apr. 9, 1998

(51) Int. Cl.[7] .................................................. H04L 27/26
(52) U.S. Cl. .......................... 375/134; 375/132; 375/138; 375/131; 340/825.3; 340/825.43; 370/342; 370/349
(58) Field of Search ....................... 340/825.34; 375/134, 375/138

(56) References Cited

U.S. PATENT DOCUMENTS

| | | |
|---|---|---|
| 4,435,821 | 3/1984 | Ito et al. ............................... 375/137 |
| 4,606,041 | 8/1986 | Kadin .................... 375/134 |
| 4,612,652 | 9/1986 | Kadin .................... 375/134 |
| 4,614,945 | 9/1986 | Brunius et al. .................. 340/870.03 |
| 4,653,068 | 3/1987 | Kadin .................... 375/134 |
| 4,843,638 | 6/1989 | Walters ................................ 455/318 |
| 5,079,768 | 1/1992 | Flammer .............................. 370/349 |
| 5,121,407 | 6/1992 | Partyka et al. ........................ 375/141 |
| 5,390,166 | 2/1995 | Rohani et al. ........................ 370/335 |
| 5,400,246 | 3/1995 | Wilson et al. ............................ 700/17 |
| 5,408,506 | 4/1995 | Mincher et al. ...................... 375/134 |
| 5,428,602 | 6/1995 | Kemppainen ........................ 370/330 |
| 5,428,637 | 6/1995 | Oliva et al. ........................... 375/134 |
| 5,438,329 | 8/1995 | Gasouniotis et al. ............ 340/870.02 |
| 5,517,187 | 5/1996 | Bruwer et al. ..................... 340/825.3 |
| 5,546,422 | 8/1996 | Yokev et al. ......................... 375/134 |
| 5,548,582 | 8/1996 | Brajal et al. ........................... 370/206 |
| 5,610,907 | 3/1997 | Barret .................................... 370/342 |
| 5,659,303 | 8/1997 | Adair, Jr. ......................... 340/870.18 |
| 6,058,137 | * 5/2000 | Partyka ................................ 375/131 |

OTHER PUBLICATIONS

Robert C. Dixon, "Spread Spectrum Systems", Johm Wiley & Sons, 1984 ISBN 0–471–88309–3, pp. 52–54, 217–235.
Marvin K. Simon, et al., "Spread Spectrum Communications", Computer Science Press, 1885. ISBN 0–88175–017–4. vol. 1, pp. 352–358, vol. 3, pp. 386–398.

Don J. Torrieri, "Principles o0f Secure Communication Systems", Artech House 1985, ISBN 0–89006–139–4. pp. 212–215, 132, 148–150, 134–145, 92–97.

Kamilo Feher, "Digital Communications: microwave applications", Prentice–Hall Inc. 1981, ISBN 0–13–214080–2. pp. 155, 157–161, 163–165.

* cited by examiner

Primary Examiner—Stephen Chin
Assistant Examiner—Paul Rupert (57) ABSTRACT

A radio transmission system including many radio transmitters using frequency hopping carriers to intermittently transmit very short messages indicative of status of sensors associated with the transmitters. In operation, a time interval generator included in a transmitter generates pulses activating the transmitter at time intervals according to a predetermined algorithm. When activated, the transmitter transmits a message at one or several different frequencies. The frequencies are changed according to a predetermined algorithm and differ for each subsequent transmission. Alternatively, when an abnormal sensor status is detected, the transmitter transmits repeated messages at a plurality of predetermined alarm frequencies for a predetermined time regardless of the time interval generator. The system also includes one or more receivers containing a plurality of memory registers to hold digital data indicative of (a) the time and (b) the frequency of the next transmission occurrence independently for each transmitter. The registers are programmed separately for each transmitter based on the time, frequency, and the content of the received messages. In addition, the receiver includes an improved RSSI circuit based on FFT to detect transmitted carrier power at several different frequencies in order to improve synchronization and acquisition. The receiver also includes one or more frequency selective circuits that are tuned in response to the outputs from FFT and the status of the time and frequency registers. In addition, there is provided a method for authentication of the received messages.

34 Claims, 5 Drawing Sheets

|    | 0   | 1   | 2   | 3   | 4   | 5   | 6    | 7    |
|----|-----|-----|-----|-----|-----|-----|------|------|
| 0  | f0  | f16 | f32 | f48 | f64 | f80 | f96  | f112 |
| 1  | f1  | f17 | f33 | f49 | f65 | f81 | f97  | f113 |
| 2  | f2  | f18 | f34 | f50 | f66 | f82 | f98  | f114 |
| 3  | f3  | f19 | f35 | f51 | f67 | f83 | f99  | f115 |
| 4  | f4  | f20 | f36 | f52 | f68 | f84 | f100 | f116 |
| 5  | f5  | f21 | f37 | f53 | f69 | f85 | f101 | f117 |
| 6  | f6  | f22 | f38 | f54 | f70 | f86 | f102 | f118 |
| 7  | f7  | f23 | f39 | f55 | f71 | f87 | f103 | f119 |
| 8  | f8  | f24 | f40 | f56 | f72 | f88 | f104 | f120 |
| 9  | f9  | f25 | f41 | f57 | f73 | f89 | f105 | f121 |
| 10 | f10 | f26 | f42 | f58 | f74 | f90 | f106 | f122 |
| 11 | f11 | f27 | f43 | f59 | f75 | f91 | f107 | f123 |
| 12 | f12 | f28 | f44 | f60 | f76 | f92 | f108 | f124 |
| 13 | f13 | f29 | f45 | f61 | f77 | f93 | f109 | f125 |
| 14 | f14 | f30 | f46 | f62 | f78 | f94 | f110 | f126 |
| 15 | f15 | f31 | f47 | f63 | f79 | f95 | f111 | f127 |

FREQUENCY HOPPING SYSTEM FOR INTERMITTENT TRANSMISSION WITH RECEIVER USING INDIVIDUAL TRACKING, FFT, AND AUTHENTICATION

BACKGROUND OF THE INVENTION

1. Field of the Invention

This invention relates to radio transmission systems in which a plurality of transmitters intermittently transmit short messages indicative of status of sensors associated with the transmitters, to a method of synchronization suitable for using frequency hopping carrier in such systems, and to a method of authentication of the received messages.

2. Description of the Prior Art

In certain types of radio transmitter systems there exist many transmitters that periodically transmit very short messages to one or more receivers. One example of such systems is burglary and fire alarm systems. In these systems, many transmitters located at different places in a building transmit messages indicative of the status of monitoring sensors to a receiver that collects the data from the sensors. Normally, the transmitters transmit supervisory status messages that are as short as feasible and the period between the transmissions is as long as feasible in order to minimize the average current drain as the transmitters in these systems are typically battery operated. In addition, short and infrequent transmissions lower the probability that the data is lost due to collisions which occur when two or more transmitters transmit at the same time. However, when an alarm condition occurs, a transmitter transmits immediately in order to convey the alarm message with little delay.

Typically, such systems transmit data at a single frequency. Thus, they are susceptible to interference and signal loss due to phenomena known as multipath fading. Consequently, the reliability of such systems is compromised or conversely, the transmitted power has to be increased to overcome the fading, which results in a larger power drain and a shorter battery life. Besides, there usually are regulatory limits that restrict such transmitter power and thus limit the possible compensation by sheer increase of power. Since the multipath effect is highly sensitive to the frequency of the transmitted carrier, the frequency hopping spread spectrum technique has a potential to eliminate these drawbacks. However, frequency hopping systems require long acquisition time and they are typically used in two way communication applications in which all the devices are continuously synchronizing with one master device or with each other using a variety of synchronization methods as shown in some of the following references. In other cases, to ease the synchronization problem, there are employed multichannel receivers that can simultaneously receive signals at many frequencies by making the receiver broadband or by using several receivers at the same time. Generally, those solutions suffer from performance degradation or high cost or both, which makes them less desirable for low cost applications that require high reliability such as security alarms.

For example according to U.S. Pat. No. 4,843,638 granted to Walters, a receiver local oscillator has a comb spectrum. This effectively makes it a wide band since each of the frequency range down-converted by the spectral components of the local oscillator will fall in the receiver pass-band and raises the noise floor at the detector input. Consequently, the sensitivity of such receiver will be adversely affected.

In another example according to U.S. Pat. No. 5,428,602 granted to Kemppainen, each hoppping frequency is monitored by a separate receiver. This is very costly and presently not suitable for low cost systems.

In another example, according to U.S. Pat. No. 4,6149,45 granted to Brunius et al., a system is described that allows multiple instruments to be monitored and data to simultaneously transmitted by several radio transponders. However, in order to operate properly, the transponders have to be energized by a RF signal to begin a transmission sequence. This necessitates a radio receiver to be included in the transponder. This makes the system a two-way communications system. Such systems are inherently more complex and costly than one-way communications systems.

In yet another example, according to U.S. Pat. No. 5,659,303 granted to Adair, a transmitting apparatus is described that transmits bursts of data continuously at varying time intervals and at varying frequencies. However, the apparatus as described in the preferred embodiment and associated claims, allows identical hopping pattern to be realized in the transmitters. A means is provided to offset the starting point of the variation sequence for different transmitters depending on the transmitter ID, so that the hopping sequences in various transmitters are initially offset in respect to each other. However, due to unavoidable reference frequency drifts that are different in various transmitters, the sequences may slide in respect to each other. Consequently, it is only a matter of time that the patterns of two or more transmitters will be aligned thus producing a condition for persistent collisions of the transmitted data bursts. In addition, Adair does not provide for a receiving apparatus or a method that would allow such transmitted signals with varying frequencies to be received. In the case of Adair's invention, the actual sequence used by a transmitter is not predetermined but instead it may vary with temperature and depends on the transmitter circuit design and manufacturing tolerances, therefore the signal acquisition is made even more difficult.

A serious problem that must be addressed in battery operated systems is to shorten the transmission time as much as possible by making the message preamble as short as possible in order to conserve the battery power. Therefore, the synchronization of the receiver with the transmitters is a difficult task. This problem is exacerbated in some systems such as security alarms that require some messages to be conveyed to the system immediately without waiting for the scheduled transmission time. A related problem in battery operated systems is a limitation of the transmitted power in order to conserve the battery power. The frequency hopping system, if designed properly, can be advantageously used to combat multipath fading that is a major source of transmitted signal attenuation. Consequently, proper method and construction of the receiver is of great importance. The system design and the receiver design should be done to support each other advantageously.

For example according to U.S. Pat. No. 5,428,637 granted to Oliva, et al., a method is described to reduce the synchronization overhead in frequency hopping systems to reduce the burden of re-synchronization before each separate transmission. The method is based on allocation of specific time slots for any unit that desires to transmit data and thus the method requires a two-way communications to accomplish the necessary exchange of series of reservation and acknowledge messages.

Similarly, in yet another example, according to U.S. Pat. No. 5,438,329 granted to Gastouniotis et al., a two-way system is used for an efficient operation of a telemetry system designed to operate in the presence of multipath fading and interference.

Recently, multicarrier receivers, i.e. receivers that can simultaneously receive symbols at many frequencies using FFT (Fast Fourier Transform), become popular especially in the area of telecommunications. Specifically, such multicarrier receiver created the greatest interest in the area of digital subscriber loop where multiple implementations have been pursued to improve the data rate in the frequency selective communications channels by simultaneous use of multiple modulated carriers. The disadvantage of these implementations of multicarrier transceivers is that fairly complex signals are produced in the transmitters that require expensive and power hungry logic. Thus, these implementations are not suitable for the low cost and low power transmitters used for sensor monitoring.

Another implementation of multicarrier receiver is described in U.S. Pat. No. 5,548,582 granted to Brajal, et al., is aimed at reception of frequency hopping modulated carrier. The designer stated objective was to receive fast hopping modulated carrier using multicarrier receiver principle based on FFT in order to avoid the need to construct fast and phase accurate hopping controlled oscillator in the receiver/transmitter stations.

The system is in principle designed for two-way communication and as such is not suitable for low cost implementations such as required for alarm systems.

Another disadvantage of this method is that it uses a fast frequency hopping in which the data content of the transmitted message determines the sequence of the transmission frequencies and where several frequencies are used to transmit one symbol. Fast frequency hopping requires faster processing in the receiver and the transmitters and results in a more complex and expensive system.

U.S. Pat. References:

| Pat. No. | Inventor | Issued | Title |
| --- | --- | --- | --- |
| 4843638 | Walters | 6/89 | "Receiver for frequency hopped signals." |
| 5428602 | Kemppainen | 6/95 | "Frequency-hopping arrangement for a radio communication system." |
| 4614945 | Brunius et al. | 9/86 | "Automatic/remote RF instrument reading method and apparatus." |
| 5659303 | Adair | 8/97 | "Method and apparatus for transmitting monitor data." |
| 5428637 | Oliva et al. | 6/95 | "Method for reducing synchronizing overhead of frequency hopping communications systems." |
| 5438329 | Gastouniotis et al. | 8/95 | "Duplex bi-directional multi-mode remote instrument reading and telemetry system." |
| 5408506 | Mincher et al. | 4/95 | "Distributed time synchronization system and method." |
| 4653068 | Kadin | 3/87 | "Frequency hopping data communication system." |
| 4606041 | Kadin | 8/86 | "Frequency hopping data communication system." |
| 5390166 | Rohani et al. | 2/95 | "Method for recovering a data signal using diversity in a radio frequency, time division multiple access communication system." |
| 5546422 | Yokev et al. | 8/96 | "Method for transmitting low-power frequency hopped spread spectrum data." |
| 5079768 | Flammer | 1/92 | "Method for frequency sharing in frequency hopping communications network." |

-continued

U.S. Pat. References:

| Pat. No. | Inventor | Issued | Title |
| --- | --- | --- | --- |
| 5548582 | Brajal et al | 8/96 | "Multicarrier frequency hopping commmunications system" |
| 5121407 | Partyka et al. | 6/92 | "Spread Spectrum Communications System." |

Book References:

Robert Dixon, "Spread Spectrum Systems", John Wiley and Sons, 1884, ISBN 0-471-88309-3.

Marvin K. Simon et al, "Spread Spectrum Communications, vol. 1,2,3", Computer Science Press, 1985, ISBN 0-88175-017-4.

Don J. Torrieri, "Principles of Secure Communication Systems", Artech House, 1985, ISBN 0-89006-139-4.

Kamilo Feher, "Digital Communications: microwave applications", Prentice-Hall Inc, 1981, ISBN 0-13-214080-2.

SUMMARY OF THE INVENTION

Accordingly, it is an object of this invention to provide a radio transmission system including many radio transmitters that use frequency hopping carrier to intermittently transmit very short messages indicative of status of sensors associated with the transmitters, and to provide a synchronization means and method that allows a receiver to receive messages from all the frequency hoping transmitters but does not require long preamble to be included in the transmitted messages for the acquisition purpose.

It is another object of this invention to provide a method of transmission in such a system so as to improve reliability of the system in the presence of multipath fading and interference.

It is a further object of this invention to provide a method of eliminating the effect of persistent collisions in such a system that occur when two or more transmitters transmit at the same time and at the same frequency for a prolonged period of time.

It is still further object of this invention to provide a method that allows such a system to convey the information about an abnormal sensor condition as soon as the condition occurs regardless of the transmission period of the associated transmitter.

It is still further object of this invention to provide a method of transmission resistant to a deliberate interference.

It is still further object of this invention to provide a method that allows such a system to authenticate the received messages, i.e. to verify if they are valid and were sent by a valid transmitter.

According to one aspect of the invention there is provided a frequency hopping radio transmission system comprising a plurality of transmitters and associated sensors and a receiver, wherein said transmitters intermittently transmit very short messages indicative of status of the sensors associated with the transmitters.

Each transmitter includes a time interval generator means to produce pulses controlling the time interval between successive transmissions, a frequency synthesizer-modulator means to generate a modulated radio frequency carrier signal wherein the frequency of the carrier changes in response to programming the synthesizer by digital data, a reference frequency oscillator providing a frequency reference from which the synthesizer derives carrier frequencies and, preferably, from which the time interval generator derives its timing, a transmitter control logic means activated in response to pulses from the time interval generator or a sensor signal indicating an abnormal condition, wherein when activated, the transmitter control logic activates and programs the synthesizer so that the transmitter carrier frequency is changed according to a predetermined frequency hopping algorithm, provides digital data indicative of the sensor status, battery status, the transmitter ID and other data as described below, and modulates the carrier with the provided data.

The receiver includes a means to digitize the received signal within the entire band of interest at least twice the Nyquist rate, a Fast Fourier Transform means to transform the received samples to produce plurality of outputs indicative of the power of the frequency components present in the sampled signal, at least one frequency converter each followed by a low pass filter and data demodulator to process a selected transmission frequency channel and demodulate a signal present therein, wherein the frequency converter is tuned to the selected transmission frequency channel in response to the processing of the FFT outputs.

In addition, the receiver control logic includes a receiver timer to measure the elapsing time, and a plurality of memory registers to hold digital data indicative of (a) the time of the next transmission occurrence for each transmitter and (b) the frequency of the next transmission occurrence for each transmitter, wherein in operation, the control logic sequentially compares, the data content of the time registers with the data content of the timer and if the transmission is due from a transmitter, the control logic programs the frequency selective radio receiver circuit according to the data content in the frequency register associated with said transmitter, attempts to decode the demodulated signal, modifies the content of the time register by a number representative of the time interval between the successive transmissions for said transmitter and modifies the content of the frequency register according to a predetermined algorithm for said transmitter. This way, more robust operation is obtained in the presence of interference; the FFT circuit speeds up the acquisition, the controller with its frequency and time registers provides for individual tracking of all the transmitters. In combination, these two mechanisms provide for a very robust operation.

According to the second aspect of the invention, there is provided a method of transmission in the system so as to improve reliability of the system in the presence of multipath fading and interference, the method is based on arranging the frequencies available for transmission in a plurality of groups of frequencies, wherein each said group consists of a predetermined number of frequencies selected in such a way that they are approximately uniformly distributed in the entire available spectrum and separated by large but uneven frequency intervals, wherein a single message is transmitted on one or more frequencies in one group and subsequent messages are transmitted on the next frequencies in the group until all frequencies in the group are used, then a new group is selected and subsequent messages are transmitted using the frequencies from the new group and so on until all frequencies in all groups are used. Then, the process is repeated. Wherein the order in which the groups and the frequencies in the groups are selected is determined in accordance with a predetermined algorithm.

According to the third aspect of the invention, there is provided a method of minimizing the effect of collisions, the method is based on selecting the sequence to use the frequencies within each group and selecting the sequence in which the groups are used to be different for each transmitter, wherein resulting transmitter frequency sequence depends on the transmitter ID number or other number which is included in the transmitted message, so that, upon reception of a message from a transmitter, the receiver can determine what is the next frequency for this transmitter.

According to the fourth aspect of this invention, there is provided another method of minimizing the effect of collisions that can be used alone or in conjunction with the third aspect of this invention, the method comprising randomizing the time interval between transmissions individually for each transmitter and a receiver compensating for the time interval changes.

According to the fifth aspect of this invention, there is provided a method that allows such a system to convey the information about an abnormal sensor condition as soon as the condition occurs regardless of the transmission period of the associated transmitter. The method is based on selecting an alarm frequency or preferably a group of alarm frequencies common for all transmitters. The alarm frequencies are used by the transmitters when an alarm or an abnormal sensor condition occurs, wherein when such a condition occurs in a transmitter, the transmitter transmits the messages sequentially on the alarm frequencies for a predetermined period of time after which the transmitter resumes transmissions according to the sequence before the alarm condition, wherein the receiver monitors the alarm frequencies during the time between the reception of scheduled messages from the transmitters.

According to the sixth aspect of this invention there is provided a method that allows the receiver to verify quickly whether the received message belongs to one of the transmitters associated with this receiver or some other spurious source without waiting for a complete message transmission. The method is based on encoding the transmitted pattern by encoding the transmitted data with a predetermined pattern that can be decoded by the receiver without the reception of the entire message. Equivalently, the receiver can monitor other unique features of the received signal, for example modulation index or format, to accomplish that.

According to the seventh aspect of this invention, there is provided a method to detect a false transmission produced by an imposter transmitter. The method includes encrypting the transmitted message using a nonlinear encryption algorithm in such way that the transmitter ID or a number derived from it is used as a decrypting key, wherein a transmitted packet includes a variable number that is varied with each transmission. The variable number consists of two parts: one part is a number indicative of the next transmission frequency, the second part is a pseudo random or a sequential number that is changed on the sequence boundary, i.e. each time the cyclic frequency hopping sequence wraps around. For example, if the frequency hopping sequence length is P, then the random or sequential number is changed every P transmissions. The receiver upon reception of the packet, decrypts the message using the decrypting key and determines validity of the message by first checking if the decoded message contains, the matching transmitter ID number, then by checking if the information indicative of the next transmission frequency is correct for this transmitter by comparing the received data with the locally computed next frequency for this transmitter.

A further improvement combines the transmitter ID included in the message with the frequency information using bit by bit EXOR operation prior to the encryption. In the receiver, a reverse operation is performed. First the receiver computes the next frequency for this transmitter, then EXOR the information bit-by-bit with appropriate bits in the received message. The resulting message should have the matching transmitter ID number, which can be easily verified. The benefit of this operation is the reduction of the message length.

These and other objects, advantages and features of this invention will be apparent from the following detailed description of illustrative embodiment that is to be read in connection with the accompanying drawings.

DETAILED DESCRIPTION

Figure 1:
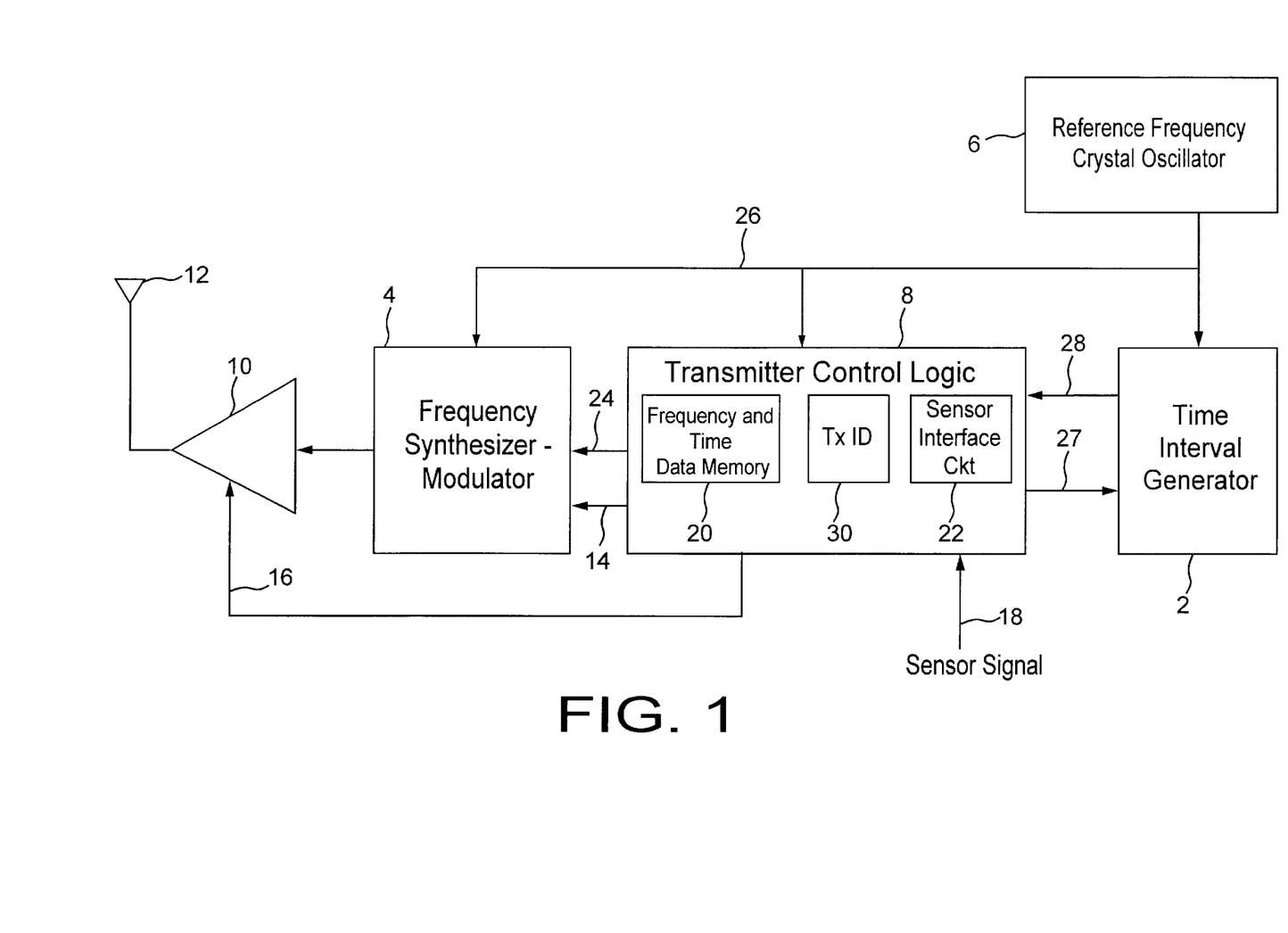
FIG. 1 is a block diagram of a transmitter according to a preferred embodiment of the present invention.

Referring to FIG. 1, the transmitter includes a reference frequency crystal oscillator 6 to produce a stable frequency on line 26, a time interval generator 2 establishing a time base to produce pulses on line 28 activating the transmitter, a frequency synthesizer-modulator 4 to produce a radio frequency carrier modulated by modulation data fed to the synthesizer via line 24, wherein the frequency of the carrier is programmed to a desired value via plurality of lines 14, transmitter control logic 8 to activate and program the synthesizer-modulator 4 via plurality of lines 14 when the logic is activated by a pulse from the time interval generator or by an abnormal signal indication on a sensor signal input line 18, an amplifier 10 to amplify the radio carrier provided by the synthesizer when the amplifier is activated by the control logic 8 via line 16, and an antenna 12 to radiate the power delivered by the amplifier. The control logic 8 includes a frequency and time data memory register 20 to hold information used to determine the time and the frequency of next transmission, and a sensor interface circuit 22 to accept the sensor signal and detect an abnormal signal condition, and to convert the sensor signal to a digital format suitable for transmission. The transmitter logic also includes a storage means 30 to store a transmitter ID number to differentiate this transmitter from other transmitters. The transmitter control logic, in some systems, can be realized based on a microprocessor, in some other systems, a specialized component may be used.

In operation, during the time between transmissions, the transmitter is in a standby mode in which the amplifier 10 and synthesizer-modulator 4 are not active and, preferably, the control signals turn off the power from these circuits in order to minimize the standby current of the transmitter. The transmitter control logic 8 is in a standby mode in which most of the circuits are inactive and some or most of the circuitry can be powered down with the exception of the circuits supporting critical functions; (a) the sensor interface circuit 22 that detects an abnormal signal condition and produces a binary signal that is logically combined with the signal 28 produced by the time interval generator so that when either a pulse or abnormal condition occurs the rest of the transmit logic circuitry is activated or powered up, (b) the frequency and time data memory 20 that has to retain the data during the period between transmission and consequently either it has to be a nonvolatile type or it has to be powered up during the period between transmissions. Upon activation, the control logic 8 determines the activation source by reading signals 28 and 18.

When the logic 8 is activated by a pulse 28 from the time interval generator, the following sequence of events occurs. First, the logic reads the frequency data memory and produces a data packet that includes the sensor status, the transmitter ID number and other data such as battery status. Then, the logic activates and programs the synthesizer-modulator 4, activates the amplifier 10 and sends the packet to the modulator via line 24. After completion of each transmission, the transmitter logic sets the transmitter in the standby mode until activated again by a pulse on line 28 or a sensor abnormal condition indicated on line 18.

In the preferred embodiment the transmission of a packet can be repeated a predetermined number of times at separate frequencies, wherein the number of repetitions is chosen according to application needs and, wherein the frequencies are determined by the transmitter logic according to an algorithm described later in details. This way it is possible for the receiver to receive some repeated packets even if the other packets are lost due to frequency selective fading caused by multipath or due to interference.

When a sensor abnormal condition occurs, the sensor interface circuit 22 produces an active level of the signal indicative of the sensor abnormal level which activates the transmitter via a combinatorial logic circuit that combines the sensor abnormal level signal with the pulses from the time interval generator. When activated this way, the transmitter control logic 8 produces a data packet that includes the sensor status, then the logic activates and programs the synthesizer-modulator 4, activates the amplifier 10, and sends the packet to the synthesizer-modulator. In the preferred embodiment, the transmission of the alarm packet is repeated a predetermined number of times using a plurality of predetermined alarm frequencies in such a way that the transmission frequency is changed after each single packet transmission according to a predetermined fixed sequence. In the preferred implementation, when the alarm packets are transmitted, the time intervals between transmissions are minimal; when one transmission is completed, the transmitter immediately programs to the next frequency and repeats the packet transmission, etc.

In the preferred embodiment there are eight frequencies used for this purpose, as described below. It should be noted that the existence of the predetermined alarm frequencies is not necessary albeit advantageous. In an alternative design, the transmitter may follow the normal hopping pattern but an increased rate repeating the alarm message a predetermined number of times. The essence of the idea is that the alarm message being infrequent can afford a much greater transmission overhead and can be repeated many times. If the alarm message is transmitted at fewer frequencies, a faster response of the receiver is obtainable on average, however the system may be more vulnerable to a deliberate interference.

After the transmission sequence is completed, the control logic disables the signal indicative of the sensor abnormal status so that an abnormal sensor status can not activate the control logic. Then, the control logic puts the transmitter in the standby mode until activated by a pulse from the time interval generator. When subsequently activated, the transmitter control logic performs the usual transmission sequence but the data packets include information that the sensor condition is abnormal if the condition persists. When the abnormal condition subsides, the signal indicative of an abnormal status is enabled so that a subsequent occurrence of an abnormal condition can activate the logic and trigger a new alarm transmission sequence; thus, normal operation is restored.

In the preferred embodiment, the use of frequencies is determined as follows. First, the entire available spectrum is divided into a plurality of channels. The number of channels depends on the available spectrum and the receiver bandwidth. In the preferred embodiment, a 26 MHz bandwidth is divided into 173 channels, each channel having 150 kHz. Then 8 channels are selected so that they are separated by large but uneven frequency intervals. Wherein, a large interval is defined here as comparable to the coherence bandwith of the transmission channel. The large separation improves probability that if one of the channels is faded due to the multipath, the next channel is not faded. The uneven separation ensures that a single harmonic interference does not interfere with all channels. In the preferred embodiment, these channels are reserved for the transmission of abnormal sensor status and will be referred to as alarm frequencies. These frequencies are excluded from use if the sensor status is normal. In addition, channels on each side and immediately adjacent to each alarm frequency are also excluded from use in order to minimize interference with the alarm frequencies by the transmitters transmitting status messages. Thus, total number of 24 frequencies is reserved. From the remaining 149 frequencies, 128 frequencies are selected in an arbitrary but preferably non-uniform way and assigned indexes from 0 to 127 in such a way that a smaller index corresponds to a lower frequency. Then the frequencies are organized in a matrix in the following way. There are 8 columns and 16 rows in the matrix. The frequencies in the first column are from $f_0$ to $f_{15}$, in the second column from $f_{16}$ to $f_{31}$, and so on. This way, the frequencies in the first row are $f_0, f_{16}, f_{32}, f_{48}, f_{64}, f_{80}, f_{96}, f_{112}$, the frequencies in the second row are $f_1, f_{17}, f_{33}, f_{49}, f_{65}, f_{81}, f_{97}, f_{113}$, and so on. Consequently, the frequencies in each row are separated by large and uneven frequency intervals. Referring to FIG. 3b the frequency matrix 300 has eight columns numbered 0 to 7 and 16 rows numbered 0 to 15. This way of organizing the matrix of frequencies is the same for each transmitter and the receiver. However, in the preferred embodiment, the sequence in which these frequencies are used is different for different transmitters. The following is the description how this is accomplished in the preferred embodiment. Each transmitter includes two pseudo random sequence generators, wherein a pseudo random sequence generator is based on a linear feedback shift register, wherein some outputs of the shift register are fed back to an EX-OR (Exclusive OR) gate whose output is connected to the register input. For a certain combination of the outputs that are fed to the EX-OR gate, the shift register can produce a sequence that has $2^{Ng}-1$ bits, wherein Ng is the length of the generator shift register. Such a sequence is called a maximum length sequence. Alternatively, if all the outputs of the shift register are taken at a time, then a pseudo random sequence of $2^{Ng}-1$ numbers is created, wherein all the numbers are Ng digits long and each number differs from all the other numbers in the sequence; the numbers range from 1 to $2^{Ng}-1$. Such pseudo random generators are known to the skilled in the art and do not require additional description. The first generator is based on a three-bit shift register with feedback taken from the first and the last bit. This register produces a sequence of seven numbers, wherein each number has three digits. The numbers change from 1 to 7.

Figure 3A:
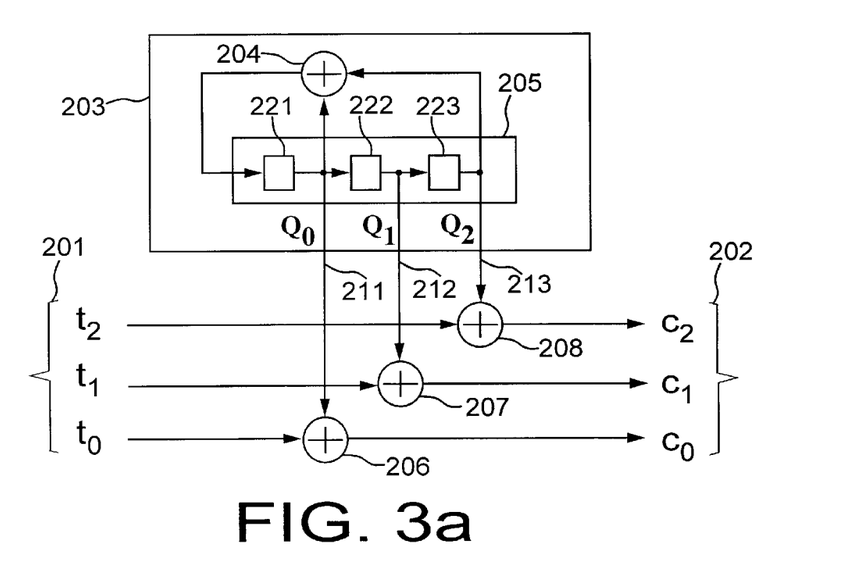
FIG. 3a is a block diagram of a preferred implementation of a sequence generator used to address column of a frequency matrix.
Figure 3B:
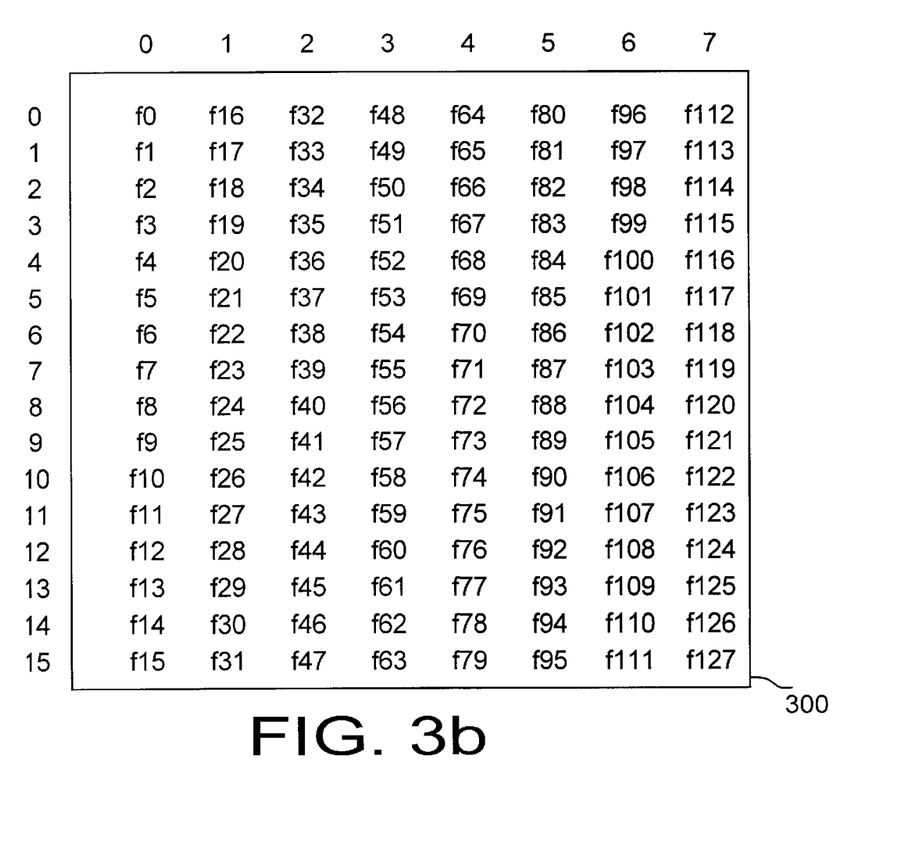
FIG. 3b is a preferred implementation of the frequency matrix.

Referring to FIG. 3a, the pseudo random sequence generator 203 consists of a shift register 205 and EX-OR gate 204. The shift register 205 is composed of three stages 221, 222, and 223 having three outputs $Q_0$ 211, $Q_1$ 212 and $Q_2$ 213 respectively. The feedback is taken from outputs $Q_0$ and $Q_2$. The three least significant bits of the transmitter ID $\{t_0, t_1, t_2\}$ 201 are combined with the output of the pseudo random sequence generator $\{Q_0, Q_1, Q_2\}$ using EX-OR gates 206, 207, 208. The result is the column address $\{C_0, C_1, C_2\}$ 202.

Assuming that the initial state of the shift register is binary 111 (decimal 7), the produced sequence is $\{7, 3, 5, 2, 1, 4, 6\}$. These numbers are then combined with the last three bits of the transmitter ID using bit by bit EX-OR operation; i.e. the last bit of the transmitter ID ($t_0$) is combined with the last bit of the random number ($Q_0$), etc. This way produced new sequence has numbers ranging from 0 to 7 the order of which depends on the last three bits of the transmitter ID. Thus, 8 distinct (permutated) sequences of numbers are created. These sequences are used to address the columns of the frequency matrix. For example, if the last digits of the transmitter ID are 000, then the columns are selected in the order 7, 3, 5, 2, 1, 4, 6, i.e. the sequence is not altered. If the last three digits of the transmitter ID are 001, then the columns are selected in the order 6, 2, 4, 3, 0, 5, 7; if the last three digits of the transmitter ID are 010, then the columns are selected in the order 5, 1, 7, 0, 3, 6, 4; etc.

In the preferred embodiment, the second pseudo random sequence generator has 4 bits; the feedback is taken from the first and the fourth bit. The resulting four bit numbers are combined using bit by bit EX-OR operation with the next 4 digits of the transmitter ID i.e. with the bits fourth, fifth, sixth and seventh to produce 16 sequences of numbers varying from 0 to 15. The resulting new sequences are used to address the rows of the frequency matrix. The column address is changed faster than the row address; the column address is changed first until all seven numbers of the column address sequence are used, then the row address is changed then the column address changes are repeated etc. It is apparent, that any two sequences are quite different even though the ID number is changed only on one position. This is advantageous since it lowers the probability of persistent collision that may happen if two or more transmitters transmit at the same time and at the same frequency for a prolonged time. Using the method of constructing hopping frequencies described above, 128 different sequences are created. This way the probability of persistent collision is small even in systems with great concentration of transmitters. It should be stressed that using the sequences as described ensures that the persistent collision is not possible since the frequencies in any arbitrary pair of sequences do not coincide persistently regardless of the relative shift of the sequences.

It should now be also apparent, that this way or organizing and using the frequencies ensures that the successive transmissions from a transmitter will occur on frequencies that are always separated by large and uneven frequency intervals. The large separation improves probability that if one of the channels is faded due to the multipath, the next channel is not faded. The uneven separation ensures that a single harmonic interference does not interfere with all channels.

For each transmitter, the future frequency can be predicted based on just one (even partially) received message since each message includes the transmitter ID based on which the receiver can determine the content of the row and column address generators for the current frequency. It is only necessary to know the last 7 digits of the transmitter ID. These digits are placed toward the end of the message in the preferred embodiment so that in case when the receiver begins reception of the transmitted message starting in the middle of the message, the transmitter ID can still be recovered and thus the next frequency can be predicted.

In some applications, this number of sequences my not be sufficient. In such cases the number of sequences can be extended to a larger number using other techniques, some of which were extensively studied and are described in the available literature. The number of available sequences for column selection is large and equals 8!=40320. Similarly the number or possible sequences for row selections is 16! or approximately 2E13. However, the method described above is preferred for its simplicity and the unique properties of orthogonality of all sequences. The degree of orthogonality indicates how many hits (frequency agreements) there may be between two sequences upon any relative cyclic shift of the sequences. In a perfect design, for any two sequence that use the same set of frequencies, there would be only one hit. I.e. if upon any cyclic shift of two sequences, a position is found in which the same frequency is present in both sequences, then the frequencies in all other positions would differ. The sequences produced in a manner as described in the preferred embodiment are orthogonal in that sense. Although perfect orthogonality is not necessary for proper operation of the system, it is desirable since it reduces the probability of lost packets due to collisions. However, it should be apparent that other ways of arranging the frequencies and using this method of randomizing could be created.

Normally, the time intervals between transmissions are controlled by a quartz crystal and, ideally their nominal values are the same for all transmitters, however in the preferred embodiment, the time intervals are perturbed by predetermined small time increments delta T to further randomize the transmission events and lower the probability of persistent collisions with other transmitters as well as avoiding an intentional or unintentional pulsed interference. The transmitter control logic can accomplish this by programming the time interval generator vial line 26 according to a predetermined algorithm. The information about the current status of the algorithm may be included in the transmitted packet to aid the receiver operation.

In the preferred embodiment, the method of determining the time interval perturbation is based on a similar technique as described in conjunction with row address generation for the frequency matrix, wherein the random sequence is used to alter the time interval between transmisssions. I.e. each time a transmission is performed, a new number is generated and used to determine the time interval between the current and the next transmission, wherein the time randomization is accomplished by combining the output of the three-bit pseudo random generator used for column addressing in the frequency matrix with the bits eight, nine and ten of the transmitter ID. I.e. bit $Q_0$ is combined with bit $t_7$, bit $Q_1$ with bit $t_8$, etc. The resulting 3-bit numbers (max +/−3) are used to determine how many delta T increments are added to the predetermined nominal value of the time between transmissions to determine the time of the next transmission. This way, an instant synchronization is possible, including the time perturbation, based on a single received message because the receiver can infer the status of the 3-bit generator based on the received frequency index and the transmitter ID number. I.e. the message contains the information about the 3-bit generator without explicit inclusion of the generator status bits in the message.

It is to be understood that the random frequency selection as described above and the time perturbation can be used together or in separation to achieve immunity to collisions. I.e. (a) a fixed frequency pattern for all transmitters and random time perturbation patterns individual for each transmitter can be used, or (b) a fixed time interval between transmission or fixed time perturbation pattern and random frequency selection individual for each transmitter can be used, or (c) frequency and time changes can be combined to enhance the system performance at the expense of complication.

In the preferred embodiment, both the transmission frequency and the time interval between transmissions are individually randomized for each transmitter.

According to another aspect of this invention there is provided a method to authenticating the received messages by detecting false transmissions from an imposter transmitter. According to this method the transmitted packet is encrypted by means of a nonlinear encryption technique in such a way that transmitter ID can be used as the decryption key. In general, the decryptior) key can be a function of the ID number instead of the ID number itself. The particular technique used is not important and any suitable algorithm may be used that performs a nonlinear function for the purpose of encryption. The problem is, that two identical message to be transmitted will result in the same encrypted messages and therefore are susceptible to be recorded and played back with the purpose of confusing the system receiver. Normally, the transmitted messages do not change often and even if they do, the receiver cannot verify if the change is introduced in the transmitter. In order to alleviate this, a transmitted packet contains a variable number in addition to the ID number, sensor status, battery status and other required information. The variable number consists of two parts: the first part is indicative of the next transmission frequency for this transmitter. Conveniently, this part is mixed with the transmitter ID by means of bit by bit EXOR operation in order to reduce the message length. This way, after encryption, each message is different and cannot be easily recorded and played back.

In the receiver, the receiver logic decrypts the received message using the transmitter ID (or a another number obtained as function of ID number) as the decrypting key. Then, knowing the current frequency, the receiver computes the next frequency for this transmitter and produces the number indicative of the next frequency identical to that produced in the transmitter. Then, the number is EXOR added bit by bit to the ID number in the received message in the same way as in the transmitter, thus reversing the operation of the transmitter and recovering the received transmitted ID number. Subsequently, the receiver determines the authenticity of the received message by comparing the recovered transmitter ID with the ID used for decryption of the received message.

As described above, the messages can repeat only after the entire frequency hopping sequence is exhausted and is subsequently repeated. Since the sequence can be made quite long and the time between transmissions is also long, this results in a very long time necessary to exhaust the entire hopping sequence. However, if for practical reasons the hopping sequence is chosen to be relatively short, the desired variability is obtained by adding a second part to the variable number that changes once per sequence length. Such second part can be obtained from a simple counter or from a PN generator clocked once per period of the hopping sequence. The receiver compares this number with the number obtained from previous transmissions. The variable number can change only on the sequence boundary and only in a predetermined way. If discrepancy is detected, invalid message is declared.

In the preferred implementation, the variable number includes both parts as described above, and the second part is created by clocking a PN generator.

The question remains how the receiver can decide which transmitter ID number to use for decoding. Note that, according to the described operation, the receiver is equipped with the list of ID numbers of all the transmitters that are to be monitored.

In the simplest case all the ID numbers from the list of the transmitter IDs can be tried. In the preferred implementation, as described above and elaborated later in details, the receiver is equipped with memory registers that contain the numbers indicative of the next transmission time and frequency for each transmitter. The numbers are updated every time a new message is received or when the nominal time for receiving next message from a transmitter expires even if the message was lost. So, the receiver knows which transmitter ID to use ahead of time, thus easing the computation burden and improving reliability.

Figure 4:
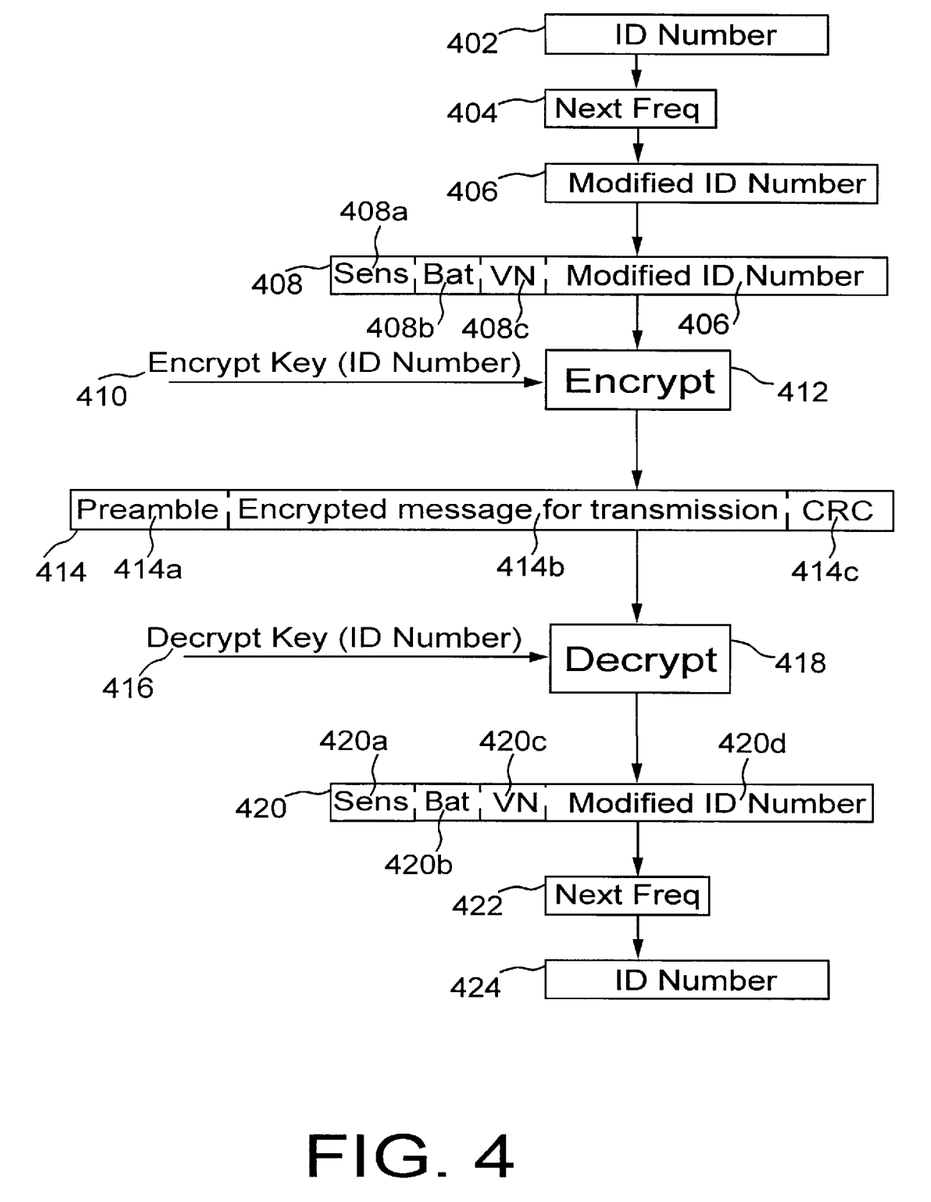
FIG. 4 is block diagram depicting the authentication process of the received messages.

Referring to FIG. 4, in the transmitter, the ID number 402 is taken first, then the number indicative of the next frequency 404 is computed and EXOR added bit by bit with the transmitter ID number to produce modified ID number 406. Subsequently, sensor status 408a, battery status 408b, and optionally variable number 408c are combined with modified ID number 406 to produce complete message 408. The message 408 is encrypted by encryption process 412 using encryption key 410 that is a function of ID number. The resulting encrypted message 414b is combined with a preamble 414a and CRC (Cyclic Redundancy Check) 414c to form the message 414 to be send through the channel.

In the receiver, the received message is first stripped of the preamble and checked for errors using CRC. Then, the message is decrypted by the process 418 using the decryption key 416 that is a function of the transmitter ID number. The resulting recovered modified message 420 is further processed by adding EXOR bit by bit the number indicative of the next frequency for this transmitter 422 identical to the number 404 used by the transmitter to modify the message. This results in the transmitter ID 424 to be completely recovered. Now the receiver can compare tie received transmitter ID number 424 with the number used for decryption 416. Of course, the decryption process 416 also results in recovering sensor status 420a, battery status 420b, the variable number 420c. The variable number 420c, and modified ID number 420d is further used to detect invalid transmissions as described previously.

Although in the preferred implementation the next frequency number is conveniently used for verification of valid messages, any other number indicating past, present or future frequency that can be computed in the receiver based on the present frequency can be successfully used as well. Also, although in the preferred implementation, the frequency hopping patterns are different for different transmitters, this is not required for the authentication process that will work even if the hopping patterns are the same.

The described method of authentication protects the system from fraudulent activities including sending a previously recorded valid message from a valid transmitter in order to confuse the receiver.

According to another aspect of the invention, the receiver can examine the transmitted waveform looking for specific parameters such as frequency deviation, modulation type, data encoding, or specific data patterns included in the transmitted data. This is done by the receiver to differentiate between the signals from the transmitters that belong to the system and some spurious transmitters or interference.

In the preferred implementation, the transmitted data is encoded using modified duo-binary encoding technique as described in details by Feher. The summary of the technique is given below. The technique is based on the transformation of the binary data according in the following way.

First, the input data bits are first pre-encoded into and intermediate bits stream by the following recursive equation:

$$b_i = a_i \bmod b_{i-2} \text{ (modulo 2 addition)}$$

Then the final output is produced using the following equation:

$$c_i = b_i - b_{i-2} \text{ (algebraic subtraction),}$$

where
  $a_i$ is the i-th input data bit
  $b_i$ is the i-th intermediate data bit, $b_{i-2}$ is an intermediate data bit two bits prior to $b_i$.
  $c_i$ is the i-th output data bit
  $a_i$, $b_i$ can assume values 0 or 1 for the purpose of modulo 2 operation.
  $b_i$ can assume values −1 or +1 for the purpose of algebraic operation,
  $c_i$ will result in three possible values −2, 0 or +2.

The resulting signal is a three level signal with spectral characteristic that is unique in that it peaks at ¼ of the data rate and has spectral nulls at zero frequency and ½ of the data rate. In addition, due the encoding as shown in the preceding equations, the signal follows specific transition patterns that can be used in the receiver to distinguish this signal from other signals using conventional modulation techniques. For example, a careful analysis shows that the encoded message bits can be divided into a train of odd bits and a train of even bits, wherein in any train two following bits of extreme value always have opposite polarity. This fact can be conveniently used in the receiver. While the message is being received, the receiver controller checks if the message conforms to the encoding pattern. If violation is detected, the message is either corrupted or the signal is sent by some other source, in which case the receiver abandons further demodulating of this signal and releases the demodulator resource to be available to demodulate signals on other channels.

Figure 2:
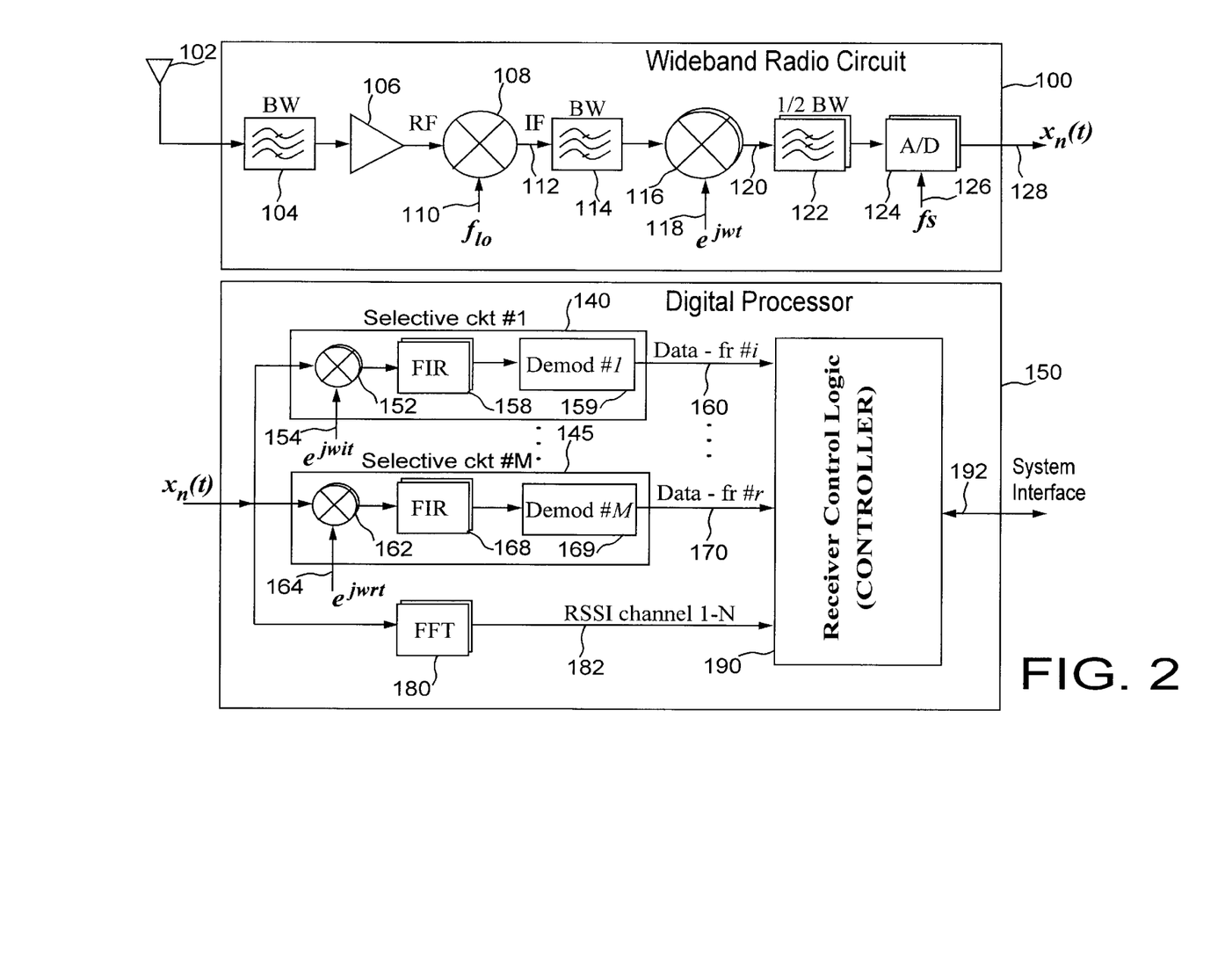
FIG. 2 is a block diagram of a receiver according to a preferred embodiment of the present invention.

Referring to FIG. 2, the receiver includes a wide band radio circuit 100 with antenna 102 and a digital processor 150 with system interface 192.

In operation, the wide band radio circuit 100 contains RF (radio frequency) bandpass filter 104 to select desired band of frequencies. The filtered signal is fed to a low noise amplifier 106 and further to the mixer 108. The mixer mixes the selected band of frequencies with the local oscillator frequency $f_{lo}$ 110. The resulting signal 112 is further filtered by IF (intermediate frequency) filter 114 having essentially the same bandwidth as the RF filter 104. The IF signal is fed to a complex mixer 116 to be mixed with complex signal $e^{jwt}$ 118. The resulting complex baseband signal 120 is filtered by a complex low pass filter 122 having bandwidth approximately half the bandwidth of the RF and IF band pass filters. Subsequently, the filtered signal is sampled by A/D converters 124 with clock signal 126 at the rate fs chosen at least two times the Nyquist frequency of the sampled signal. Sampled complex signal $x_n(t)$ 128 is fed to the digital processor 150. The local oscillator frequencies 110 and 118 can be produced using any well-known methods such as a suitable frequency synthesizer. Such described receiver is wide band. i.e. it processes the entire band of interest that can contain a number of frequency channels, where each channel can carry a modulated frequency carrier.

The complex sampled signal $x_n(t)$ 128 is fed to logic 180 performing FFT (Fast Fourier Transform) of the sampled signal. The sampling rate fs and the number of samples N taken for the FFT are related and conveniently chosen to obtain frequency resolution two times greater than the number of channels in the processed frequency band. The FFT output represents; N frequency bins. Preferably, every other frequency bin of FFT is centered at the center of the transmission channels, and the alternative bins are centered between the transmission channels. This is accomplished by a preferred setting of the local oscillator frequencies $f_{lo}$ 110 and $e^{jwt}$ 118 in addition to proper choice of sampling frequency fs and FFT length N.

In addition, gating and windowing is applied before FFT is performed although this operation is not shown in the drawing. The windowing function is to smooth out the signal at the edges of the N sample window. This is necessary to lower the common impairments in FFT processing, namely spectral leakage and spectral smearing. The preferred window is a Kaiser-Bessel window.

Gating has a special purpose in the preferred implementation.

Normally in signal processing, the FFT is performed on N samples and when finished, the next block of consecutive N samples are taken for processing etc. In the preferred implementation, when one block of N samples is converted, the next K-1 blocks are ignored and K-th block of N samples is processed, etc. This way only every K-th block is processed by FFT. This serves the purpose of saving the amount of processing by a factor of K and results in a lower cost and lower power consumption.

In operation, the FFT performs periodic processing of the sampled signal and the resulting output 182 is fed to the controller 190 further processing the FFT output to determine the power of spectral component in each frequency bin. A sudden power change detected on one or more frequencies may indicate that a new message (or messages) is being transmitted. The transmitted messages have a message preamble included in them in order to allow the receiver to acquire and synchronize. The longer the preamble, the less often the receiver has to perform FFT processing (larger K factor), however, the longer the transmitted message, the more battery energy is drained.

The number K is chosen judiciously as a trade off between the speed of acquisition and message length as desired for a specific system design.

The same signal $x_n(t)$ is fed to M frequency selective circuits in the digital processor 150. Only two frequency selective circuits are shown: circuit #1 140 and circuit #M 145, wherein circuit #1 consists of a complex mixer 152, a complex FIR low pass filter 158 and a demodulator 159, and circuit #M consists of a complex mixer 162, a complex FIR low pass filter 168 and a demodulator 169. The complex local oscillators signals $e^{jw_i t}$ 154 and $e^{jw_r t}$ 164 are designed using a technique commonly referred to as DDS (Direct Digital Synthesis), however in this case all the mixing is performed digitally and consequently, there is no need or a D/A converter to convert the digitally generated local oscillator signal into an analog signal as is commonly practiced with DDS. The resolution of the DDS oscillator is preferably chosen to be ¼ of the transmission channel spacing.

In operation, when the controller determines (in a way described above and further described in details below) that a transmission is taking place or is about to take place on frequency i, it directs one of the available frequency selective circuits to that frequency by appropriate programming of the DDS circuit. As shown in the FIG. 2, circuit #1 140 is receiving frequency i, and circuit #M 145 is receiving frequency r. The FIR filters 158, 168 are narrow bard multirate polyphase low pass filters. They have the same bandwidth that is related to the channel width and modulated carrier spectrum width and the resolution of the DDS synthesizer. I.e. the bandwidth is small enough to reject the adjacent channels but wide enough to pass most of the received modulated carrier spectrum. The demodulators 159 and 169 are conventional demodulators whose principle of operation and implementation depends on the modulation format used in the transmitters. In the preferred implementation, this operation is performed by a conventional DSP (Digital Signal Processor) that performs demodulation function for all circuits. The demodulated data of frequency i and r are sent to the receiver controller 190 via lines 160 and 170 respectively.

The number of circuits M is chosen depending on the desired system characteristics and the number of simultaneous receptions to be preformed.

Additional aspect of the implementation is related to the frequency drift of the transmitters and the frequency estimation for the local oscillators. Normally, the frequency drift of the transmitters can be quite large and comparable to the channel bandwidth. The receiver controller performs a frequency estimation of the detected signal using unique properties of the FFT. When FFT processes a signal containing a frequency component that is located between two frequency bins of the FFT, the power is shared between both bins, i.e., two FFT outputs indicate raise in detected power. The relative value of each output depends on the exact location of the carrier, and is higher when the carrier frequency is closer to the center of the frequency bin. Using this principle, the controller can estimate more precisely the carrier frequency and tune the DDS circuit appropriately ensuring that the signal is not attenuated or distorted by the FIR filter. The final frequency error compensation occurs in the demodulator in one of the conventional ways.

Finally, the signals detected by the receiver as described above is further processed by the controller that can take further action including sending messages as required via system interface 192.

It should be apparent that the FFT performs an improved function that is equivalent to the RSSI (Received Signal Strength Indictor) in conventional single channel receivers. The purpose of this improved multichannel RSSI is to easier and faster detect the transmitted carriers and obtain an acquisition and synchronization.

In some situations, no additional mechanism is required to receive the intermittent messages from a multiplicity of transmitters that are not synchronized with each other and that transmit short burst messages at variety of frequencies with long time intervals between the transmissions.

In many cases, however, it is advantageous to maintain simultaneous synchronization with all the transmitters in order to improve the reliability of the transmission in an environment that is heavily polluted with pulsing interference or very strong constant interference that may result in excessive spectral leakage and smearing of the FFT. If the time and frequency of the future transmission is separately computed and updated in the receiver, the receiver tunes one of the frequency selective circuits to appropriate frequency just prior to the transmission to be. Thus the interference occurring on other channels and other time can be ignored. The multichannel RSSI function is to assist the controller with obtaining initial synchronization and to reacquire synchronization with transmitters with whom the synchronization has been lost. In addition, the improved RSSI can aid the receiver in faster detection and response to the alarm messages that are transmitted at different (faster) time intervals than the usual supervisory messages. Also, the receiver with improved RSSI and equipped with tracking mechanism can perform well with fewer demodulators. In most practical situations, just one demodulator may be required, thus resulting in a simpler and less expensive receiver.

Figure 5:
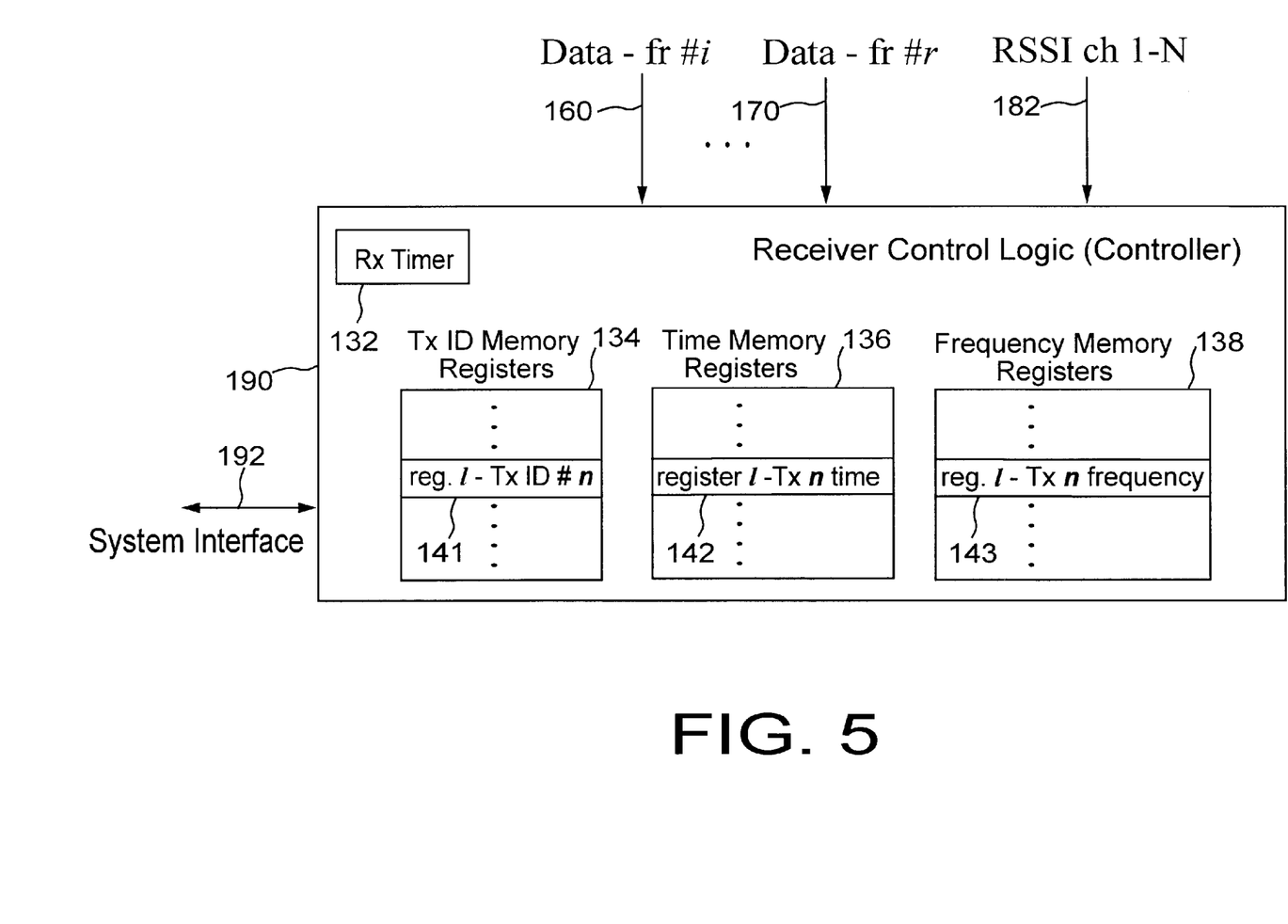
FIG. 5 is a block diagram of the controller including hopping tracking mechanism.

FIG. 5 illustrates the tracking mechanism in the receiver according to the preferred implementation.

The control logic 190 includes: (a) a plurality of ID memory registers 134 to hold digital data indicative of ID numbers for each transmitter that belongs to the system, (b) a plurality of time memory registers 136 to hold digital data indicative of the time of the next transmission occurrence for each respective transmitter, and (c) a plurality of frequency memory registers 138 to hold digital data indicative of the frequency of the next transmission occurrence for each respective transmitter. In the preferred embodiment, the registers are organized such that an arbitrary register l 141 of the plurality of ID memory registers 134 associated with a transmitter whose ID number is n, is associated with register l 142 of the plurality of time memory registers 136 and register l 143 of plurality of frequency memory registers 138, wherein said registers 142 and 143 hold data associated with said transmitter n.

In the preferred embodiment, the frequency registers 138 hold, for all the transmitters, the states of the row and column address generators for addressing the frequency array. The frequency array is as described above and it is identical to the arrays in all transmitters. If the synchronization is obtained with a given transmitter, the states of the row and column address generators are identical with that in the transmitter. In the preferred implementation, the time registers 136 hold numbers—time of next transmission—for each transmitter representing the state of the receiver timer 132 at the time the next transmission is due from a transmitter.

In operation, the receiver control logic 190 sequentially compares the data content of the time registers 136 with the data content of the receiver timer 132 and if the transmission is due from a transmitter, the control logic programs the frequency selective radio receiver demodulator circuit by changing the local oscillator frequency 154 or 164 according to the data content in the frequency register 138 for this transmitter, attempts to decode the demodulated signal, changes the content of the time register based on the number representative of the time interval between the transmissions for this transmitter and changes the content of the frequency register according to a predetermined algorithm for this transmitter. I.e. the frequency and the time registers are updated each time a transmission is due regardless whether the packet was received successfully. The new content of the frequency register is determined according to the algorithm for the frequency use by the transmitters.

The new content of the time register is calculated based on the current content of the receiver timer and a number representative of the time between the current transmission and the next transmission for this transmitter, wherein said number is calculated based on the nominal value of the time between the transmissions and adjusted by the pseudo random perturbation performed according to the previously described algorithm. In addition, said number is corrected by a correction factor based on the measured difference between the transmitter time base and the time base of the receiver, wherein said difference is determined in a manner described later in details. In the preferred embodiment, the numbers representative of the time base differences are stored in the time registers 136 separately for each transmitter and are independent from the numbers representing the time of the next transmission, i.e. the time registers are split to hold two independent numbers.

It should be noted that even if crystal oscillators are used in the transmitters and the receiver to control the timing, the error accumulated during the time between transmissions may be significant compared to the packet time. For example, if the period between the transmissions is 100 seconds and the crystal frequency error due to tolerance and temperature changes is +/− 20 ppm (parts per million) for the transmitter and +/− 10 ppm for the receiver, then the error may be as large as 3 ms. If the time for the transmission of one packet is 5 ms, then the error is significant. In order to minimize the time error accumulated during the long time between the transmissions, the receiver can store the time difference between the ideal and the actual time of the packet reception and use the difference to predict more accurately the next transmission time. For example, if the timer resolution is 0.3 ms, then the next transmission time can be predicted with accuracy 0.3 ms, providing that the temperature does not change appreciably over 100 s period. This represents an improvement of an order of magnitude. I.e. the receiver can program its frequency 0.3 ms in advance to each new frequency, examine it for the duration of the packet, then program to the next frequency and so on.

During the acquisition, when the time error is not known, the receiver needs to tune to the first frequency at least 3 ms in advance. If during the next 6 ms no valid signal is present, the receiver programs to the next frequency 6 ms in advance and so on. To alleviate this acquisition problem, the receiver includes a frequency error detection means as described below.

When a transmitted carrier is detected, the receiver measures the relative frequency error of the carrier. The receiver does it in two ways. First, the receiver uses FFT outputs to estimate coarse error as described above. Second, the receiver obtains the more precise the frequency error value from the demodulator based on the principle described below.

In the preferred implementation, the time base and the transmission frequency of a transmitter are derived from the same source. Likewise, the time base and receiver frequency of are derived from the same source in the receiver. Consequently, by knowing the frequency error between transmitter and receiver, the time base error can easily by calculated and compensated for.

For example if the transmitted carrier is 900 MHz and the measured frequency error is 9 kHz, the frequency references in the receiver and the transmitter are off by 10 ppm. Consequently, the time base is also off by 10 ppm. If the nominal value of time between transmissions is 100 s, then the timing error is 1 ms.

In the preferred implementation, the receiver compensates for the time base difference by adding or subtracting a correction value to the nominal value of the time between transmission. The correction value is obtained individually for each transmitter.

Also, the obtained frequency error is stored to be used during subsequent reception of the signal from this transmitter. The stored error value is used to initiate the demodulator to ease the demodulator synchronization process. This lowers the requirements for the length of the preamble included in each packet for the purpose of carrier and data timing acquisition.

It should be stressed that in the preferred implementation of the receiver t he time and frequency registers and the improved RSSI circuit work in harmony to obtain faster acquisition and better tracking. Although the receiver could operate with RSSI circuit alone or with the time and frequency registers based tracking apparatus alone, the combined action results in a more robust system and is therefore preferred.

Such precise time and frequency tracking provides for yet another way to authenticate received messages working alone or in conjunction with previously described method of authentication. In the preferred implementation, if a message is received from a transmitter at a wrong frequency or at a wrong time, it is declared invalid. Here, wrong frequency is defined as inconsistent with the present position of the hopping sequence as computed in the receiver, and wrong time is defined as inconsistent with the time computed in the receiver, wherein time computation includes a time error window based on cumulative effect of the maximum anticipated time error due to relative time base difference between the transmitter and the receiver.

In operation, the receiver scans the alarm frequencies by monitoring the outputs of FFT and by tuning the frequency selective circuits sequentially to the alarm frequencies during the time when they are not occupied with the scheduled reception from the transmitters. Also, in a similar fashion, the receiver scans all the available frequencies in addition to the alarm frequencies whenever the tracking apparatus loses synchronization with one or more transmitters. If a transmitted carrier is detected, then the receiver determines if the transmitted pattern is valid by detecting the data pattern in the message or other unique properties of the modulated carrier. If the pattern is not valid, the receiver will quickly proceed to examine the next frequency. This way all the alarm frequencies are examined frequently ensuring that the receiver can receive the alarm message with a minimum delay. Also, the scan of all available frequencies is fast; the synchronization can be regained faster and more reliably because the receiver will not waste much of the time to examine very weak or spurious signals.

In the preferred embodiment, when a transmitter is powered up, for example after a battery replacement, it enters a power-up mode during which a predetermined number of packets are transmitted on the alarm frequencies in a way similar to the transmission of alarm packets. In the power-up transmission sequence, each packet includes a number that indicates how many packets the transmitter will transmit in this mode before entering a normal mode of operation. This way, the receiver can synchronize with the transmitter just after a single packet reception by calculating when the first transmission will occur in the normal mode.

In the preferred embodiment, the transmitter ID numbers for each transmitter stored in the receiver ID memory registers 134 are acquired and stored by the receiver during a process of log-in. Each new transmitter to be logged-in is placed in a close proximity to the receiver and then powered up. A very high level of the received signal ensures that the new transmitter signal is not mistaken for another transmitter. A successful log-in is confirmed by the receiver using an audio or a visual indicator that can be included in the receiver or in the system controller connected to the receiver via system interface 192. The receiver may reject the transmitters that can cause persistent collisions. For example, if its ID number has the last 10 digits identical to another transmitter already present in the system.

Although illustrative embodiments of the invention have been described in detail herein with reference to the accompanying drawings, it is to be understood that the invention is not limited to those precise embodiments, and that various changes and modifications can be effected therein by one skilled in art without departing from the scope and spirit of the invention as defined by the appended claims.

What is claimed is:

1. A telemetry system comprising:

a plurality of transmitters, each of which intermittently transmits a carrier at time intervals and at a plurality of frequencies that are independent of the time intervals and frequencies at which the other transmitters transmit and that are independent of a receiver of said carrier; and said receiver comprising means for simultaneously detecting a plurality of carriers transmitted by said plurality of transmitters;

wherein said means for simultaneously detecting a plurality of carriers comprises sampling and time-domain-to-frequency-domain transform, and is capable of producing an indicium of the signal strength of each of said plurality of carriers.

2. The telemetry system of claim 1 wherein said receiver further comprises at least one frequency selective circuit for processing and demodulating one of said plurality of carriers.

3. The telemetry system of claim 2 wherein said receiver tunes at least one of said frequency selective circuits to one of said plurality of carriers based on said indicium.

4. The telemetry system of claim 1 wherein said time-domain-to-frequency-domain transform is discrete fourier transform.

5. The telemetry system of claim 1 wherein said indicium for a first carrier is produced at a rate that is slower than the data rate of said first carrier.

6. The telemetry system of claim 1 wherein each of said plurality of transmitters changes its transmission frequency according to a first sequence that is unique among said transmitters and changes said time intervals according to a second sequence that is unique among said transmitters.

7. The telemetry system of claim 6 wherein said first sequence is based on a basic sequence and a first selecting number and said second sequence is based on said basic sequence and a second selecting number.

8. The telemetry system of claim 7 wherein, for each of said plurality of transmitters, said first selecting number and said second selecting number are based on an identification number associated with said transmitter.

9. The telemetry system of claim 1 wherein said receiver holds data indicative of: (1) the time of at least one future transmission from each of said plurality of said transmitters, and (2) the frequency of at least one future transmission from each of said plurality of said transmitters.

10. The telemetry system of claim 1 wherein said receiver holds data indicative of: (1) a time of at least one future transmission from each of said plurality of said transmitters, and (2) a frequency of at least one future transmission from each of said plurality of said transmitters, and wherein said receiver tunes at least one of said frequency selective circuits to one of said plurality of carriers based on said indicium, said time of at least one future transmission, and said frequency of at least one future transmission.

11. A method of operating a telemetry system comprising:
intermittently transmitting a carrier from each of a plurality of transmitters at time intervals and at a plurality of frequencies that are independent of the time intervals and frequencies at which the other transmitters transmit and that are independent of a receiver of said carrier;
simultaneously detecting said plurality of carriers with a receiver by sampling and time-domain-to-frequency-domain transforming said plurality of carriers; and
producing an indicium of the signal strength of each of said plurality of carriers.

12. The method of claim 11 further comprising processing and demodulating one of said plurality of carriers.

13. The method of claim 12 further comprising tuning a frequency selective circuit to one of said plurality of carriers based on said indicium.

14. The method of claim 11 wherein said time-domain-to-frequency-domain transforming comprises a discrete fourier transform.

15. The method of claim 11 wherein said indicium for a first carrier is produced at a rate that is slower than the data rate of said first carrier.

16. The method of claim 11 wherein each of said plurality of transmitters changes its transmission frequency according to a first sequence that is unique among said transmitters and changes said time intervals according to a second sequence that is unique among said transmitters.

17. The method of claim 16 wherein said first sequence is based on a basic sequence and a first selecting number and said second sequence is based on said basic sequence and a second selecting number.

18. The method of claim 17 wherein, for each of said plurality of transmitters, said first selecting number and said second selecting number are based on an identification number associated with said transmitter.

19. The method of claim 11 wherein said receiver holds data indicative of: (1) the time of at least one future transmission from each of said plurality of said transmitters, and (2) the frequency of at least one future transmission from each of said plurality of said transmitters.

20. The method of claim 12 wherein said receiver holds data indicative of: (1) a time of at least one future transmission from each of said plurality of said transmitters, and (2) a frequency of at least one future transmission from each of said plurality of said transmitters, and
wherein said receiver tunes at least one of said frequency selective circuits to one of said plurality of carriers based on said indicium based on said indicium, said time of at least one future transmission, and said frequency of at least one future transmission.

21. A telemetry receiver comprising:
means for simultaneously detecting a plurality of carriers transmitted by a plurality of transmitters, and
said means for simultaneously detecting a plurality of carriers comprises sampling and time-domain-to-frequency-domain transform, and is capable of producing an indicium of the signal strength of each of said plurality of carriers, and
wherein said carriers are transmitted intermittently by each of said plurality of transmitters at time intervals and at a plurality of frequencies that are independent of the time intervals and frequencies at which the other transmitters transmit and that are independent of a receiver of said carriers.

22. The telemetry receiver of claim 21 wherein said receiver further comprises at least one frequency selective circuit for processing and demodulating one of said plurality of carriers.

23. The telemetry receiver of claim 22 wherein said receiver tunes at least one of said frequency selective circuits to one of said plurality of carriers based on said indicium.

24. The telemetry receiver of claim 22 wherein said receiver holds data indicative of: (1) the time of at least one future transmission from each of said plurality of said transmitters, and (2) the frequency of at least one future transmissions from each of said plurality of said transmitters, and
wherein said receiver tunes at least one of said frequency selective circuits to one of said plurality of carriers based on said indicium, said time of at least one future transmission, and said frequency of at least one future transmission.

25. The telemetry receiver of claim 21 wherein said time-domain-to-frequency-domain transform is discrete fourier transform.

26. The telemetry receiver of claim 21 wherein said indicium for a first carrier is produced at a rate that is slower than the data rate of said first carrier.

27. The telemetry receiver of claim 21 wherein said receiver holds data indicative of: (1) the time of at least one future transmission from each of said plurality of said transmitters, and (2) the frequency of at least one future transmissions from each of said plurality of said transmitters.

28. A method of operating a telemetry receiver, said method comprising:
simultaneously detecting a plurality of carriers transmitted by a plurality of transmitters by sampling and time-domain-to-frequency-domain transform, and
producing an indicium of the signal strength of each of said plurality of carriers, and
wherein said carriers are transmitted intermittently by each of said plurality of transmitters at time intervals and at a plurality of frequencies that are independent of the time intervals and frequencies at which the other transmitters transmit and that are independent of a receiver of said carriers.

29. The method of claim 28 wherein said method further comprises processing and demodulating one of said plurality of carriers by a frequency selective circuit.

30. The method of claim 29 wherein said receiver tunes at least one of a plurality of frequency selective circuits to one of said plurality of carriers based on said indicium.

31. The method of claim 28 wherein said time-domain-to-frequency-domain transform is discrete fourier transform.

32. The method of claim 28 wherein said indicium for a first carrier is produced at a rate that is slower than the data rate of said first carrier.

33. The method of claim 28 wherein said receiver holds data indicative of: (1) the time of at least one future transmission from each of said plurality of said transmitters, and (2) the frequency of at least one future transmissions from each of said plurality of said transmitters.

34. The method of claim 28 wherein said receiver holds data indicative of: (1) the time of at least one future transmission from each of said plurality of said transmitters, and (2) the frequency of at least one future transmissions from each of said plurality of transmitters, and
wherein said receiver tunes at least one of said frequency selective circuits to one of said plurality of carriers based on said indicium, said time of at least one future transmission, and said frequency of at least one future transmission.

* * * * *